United States Patent Office

Re. 24,458
Reissued Apr. 15, 1958

24,458

PRODUCTION OF LUBRICANTS

Harold M. Fraser, New Orleans, La., assignor, by mesne assignments, to Shell Development Company, San Francisco, Calif., a corporation of Delaware No Drawing. Original No. 2,380,960, dated August 7, 1945, Serial No. 449,014, June 29, 1942. Application for reissue May 6, 1957, Serial No. 657,994

25 Claims. (Cl. 252—36)

Matter enclosed in heavy brackets [ ] appears in the original patent but forms no part of this reissue specification; matter printed in italics indicates the additions made by reissue.

The present invention relates to the production of lubricants, and more particularly to lubricants containing a lubricant base as, for example, mineral oil or other equivalent oils well known in the art, and [a material furnishing a hydrogenated ricinoleic acid radical: stated differently, a material containing the hydroxy fatty acid radical of hydrogenated ricinoleic acid, said fatty acid radical being present in the lubricant, and particularly a grease in the form of] a soap [or a mixture of a soap and a fatty acid] of hydrogenated castor oil, otherwise termed 12-hydroxy-stearic acid.

In one form of the present invention, it is desired to provide greases having incorporated therein a metal soap of 12-hydroxy-stearic acid, [although in lieu thereof the grease may have incorporated therein a soap in which the hydroxy fatty acid radical of hydrogenated ricinoleic acid is coupled to an organic base] as hereinafter more fully set forth. [The fact that the hydroxy fatty acid of 12-hydroxy-stearic acid may be coupled with either an organic radical or a metal radical indicates that it is the said hydroxy fatty acid radical which imparts the characteristic chemical and/or physical properties to greases having present materials containing said radical.]

Some of the materials, including those set forth furnishing 12-hydroxy-stearic acid or the hydroxy fatty acid radical of hydrogenated ricinoleic acid, or what may be termed the hydrogenated ricinoleic acid, are soluble in the oil component of the lubricant grease, and therefore require no blending agent for their incorporation in the grease. [As an example of such a material, there is set forth the lead soap of 12-hydroxy-stearic acid, said soap being soluble in the mineral oil or other oil component of the grease.] However, other materials containing the hydroxy fatty acid radical of hydrogenated ricinoleic acid are only slightly soluble or soluble with difficulty in mineral oils and other oils at low temperatures such as ordinary room temperatures, and therefore, it is necessary to provide for the permanent dispersion or blending of such material including [hydrogenated castor oil, 12-hydroxy-stearic acid, and] soaps of [hydroxy stearic acid, including] 12-hydroxy-stearic acid with the mineral and/or vegetable and/or animal oil constituent of the grease. In other words, when the material containing the hydroxy fatty acid radical of hydrogenated ricinoleic acid is soluble with difficulty, or only slightly soluble in a lubricant base, it is desirable and, in most cases, necessary, to provide a carrying agent adapted to permanently disperse said material in the lubricant base. Examples of metal soaps only slightly soluble in the mineral oil base are the aluminum soaps of hydrogenated ricinoleic acid [, and the aluminum, lead and sodium soaps of the polyhydroxy stearic acids. When the 12-hydroxy-stearic acid and/or hydrogenated castor oil itself is incorporated in the mineral oil base, it is also desirable that a blending agent be present, and particularly the blending agent comprising the aluminum soaps of the higher saturated fatty acids such as aluminum stearate, although other metal soaps may be used as the blending agent].

Many of the greases, particularly the soda base greases, when substantially dehydrated have a tendency to exhibit a granular structure. The metal soaps of hydrogenated ricinoleic acid, and particularly the metal soaps of hydrogenated castor oil as typified by the aluminum soap of hydrogenated ricinoleic acid, function as a granulation inhibitor, thereby producing a grease of extremely smooth consistency. [Similar results are obtained by incorporating in soda base greases varying amounts of hydrogenated castor oil itself or 12-hydroxy-stearic acid. These materials, as previously indicated, function similarly to the metal soaps of hydrogenated ricinoleic acid, since they are the full equivalents containing the essential hydroxy fatty acid radical of hydrogenated ricinoleic acid which is responsible for the granulation inhibiting property of said materials.]

It is desired to point out it is highly advantageous to incorporate in grease soaps of [hydroxy stearic acid, and particularly the] 12-hydroxy-stearic acid, because said soaps have a low water solubility. For example, the [lead and] aluminum soaps of hydrogenated castor oil or of 12-hydroxy-stearic acid are substantially insoluble in water. [The 12-hydroxy-stearic acid itself and hydrogenated castor oil function similarly.]

In accordance with the present invention, in one of its forms lubricant greases may have incorporated therein [a soap of hydroxy-stearic acid, as for example a metal soap of said acids, and more particularly] a metal soap of hydrogenated ricinoleic acid, said soap being the only soap. There may be a single soap of the above character present in the grease or a plurality of different soaps of the above character to thereby form a mixed soap base grease. For example, there may be present a mixture of the aluminum soaps and the lime soaps of [the hydroxy-stearic acids, and particularly soaps of the] 12-hydroxy-stearic acid [, or the grease may have incorporated therein an aluminum soap, together with a sodium soap of a hydroxy-stearic acid of the character set forth. For example, there may be incorporated in the grease in addition to the lead soap of hydrogenated ricinoleic acid an ordinary soda soap or a soda soap of hydrogenated ricinoleic acid]. In short, the grease may have present a plurality of soaps, all of which [may be soaps of hydroxy-stearic acid,] or some [of the soaps] may be [soaps of hydroxy-stearic acid, as for example] metal soaps of hydrogenated ricinoleic acid, and the remaining soaps may be the ordinary prior art soaps. [The soaps present in the grease may be those of the monohydroxy-stearic acids, or those of the polyhydroxy-stearic acids, or the lubricant having said soaps present may also have any of the prior art soaps. Said soaps inherently contain because of their method of manufacture small quantities to relatively large quantities of 12-hydroxy-stearic acid. In the example herein set forth, there is always inherent present in the soap produced at least 3 to 6% of the free fatty acid of hydrogenated castor oil, and consequently greases compounded in accordance with certain of the examples herein set forth do contain not only the soap of 12-hydroxy-stearic acid but the 12-hydroxy-stearic acid itself, as will be more fully described hereinafter.]

In accordance with the present invention, certain addition agents may be added to the grease to produce a smoother texture. Further, these greases function to reduce the milling time of the grease after cooling. It is preferred that these addition agents be added to the grease before pouring.

It is an object of the present invention to produce greases containing a material having present the hydroxy-fatty acid radical of hydrogenated ricinoleic acid, said radical being present in a soap of hydrogenated ricinoleic acid [, or in hydrogenated castor oil, or in 12-hydroxy-stearic acid itself, or in mixtures of any and all of said materials]. While the 12-hydroxy-stearic acid may be obtained by saponifying an oil which has been hydrogenated, as for example castor oil, it is obvious that the 12-hydroxy-stearic acid may be produced by other methods. Soaps may be obtained from the 12-hydroxy-stearic acid by treating the latter with [an organic compond or] metal compound.

It is a further object of the present invention to incorporate in a grease in conjunction with [a soap of polyhydroxy-stearic acid and/or] a soap of 12-hydroxy-stearic acid, [and/or 12-hydroxy-stearic acid itself, and/or hydrogenated castor oil,] a metal salt of a higher unsaturated fatty acid, and particularly an aluminum salt of a higher saturated fatty acid, to produce greases novel in the art which possess the advantages above set forth, and other advantages which will appear from the following disclosure.

The present invention will be illustrated by a number of examples, the first of which will be directed to the incorporation of an aluminum soap of hydrogenated ricinoleic acid in the lubricant base, said soap requiring the presence of a dispersing or blending agent for the purpose of permanently blending and incorporating the soap in the lubricating base.

Referring to the blending agent, it may be stated that all of the aluminum soaps of the higher saturated fatty acids starting with those containing twelve (12) carbon atoms may be used as the carrier, dispersing or blending agent. The aluminum soaps of the unsaturated fatty acids carrying more than twelve (12) carbon atoms may also be used as the carrier agent, but produce softer greases than is the case when the aluminum soaps of the saturated fatty acids are used. Instead of using aluminum soaps of the higher saturated or unsaturated fatty acids other metal soaps may be used as the carrier dispersing or blending agent, as will be apparent to those skilled in the art.

Specific examples of suitable saturated fatty acid soaps adapted to be used as blending agents are:

| | |
|---|---|
| Aluminum salt of palmitic acid | $C_{16}H_{32}O_2$ |
| Aluminum salt of myristic acid | $C_{14}H_{28}O_2$ |
| Aluminum salt of lauric acid | $C_{12}H_{24}O_2$ |
| Aluminum salt of stearic acid | $C_{18}H_{36}O_2$ |

Specific examples of suitable unsaturated fatty and resin acid soaps adapted to be used as blending agents are:

Aluminum salts of the following acids:

| | |
|---|---|
| Myristoleic acid | $C_{14}H_{26}O_2$ |
| Palmitoleic acid | $C_{16}H_{30}O_2$ |
| Oleic acid | $C_{18}H_{34}O_2$ |
| Linoleic acid | $C_{18}H_{32}O_2$ |
| Linolenic acid | $C_{18}H_{30}O_2$ |
| Abietic acid | $C_{20}H_{30}O_2$ |

In carrying out the present invention, the aluminum salt of hydrogenated ricinoleic acid, and more specifically, the aluminum salt of castor oil, is prepared as follows:

The hydrogenated castor oil, which is saponified with a suitable alkali, such as sodium hydroxide, is the usual commercial product having the following characteristics:

| | |
|---|---|
| Titre | 64.5 |
| Sapon. No | 178 |
| Iodine No | 2.57 |

The hydrogenated castor oil is a solid and has a melting point of about 72° C., which indicates that the hydrogenation process has been practically carried to completion. The best results in practicing the present invention will be obtained by producing an aluminum soap of substantially completely hydrogenated castor oil. However, the castor oil may be only partially hydrogenated and still may be used. Stated differently, the higher the degree of hydrogenation of the castor oil, the better results obtained when the aluminum soap thereof is incorporated in the lubricant base.

One thousand (1000) pounds of hydrogenated castor oil having the properties above set forth are mixed with two hundred and eighty (280) gallons of water and charged into a mechanically agitated kettle. This mixture is heated until the fatty material has melted. Thereafter, a solution of two hundred and five (205) pounds of caustic soda dissolved in one hundred and seventy (170) gallons of water is run into the kettle slowly, the time consumed in said addition being approximately thirty (30) minutes. Heating and stirring is maintained for approximately two (2) hours until the fatty base has saponified. Thereafter, a solution of five hundred and sixty (560) pounds of aluminum sulphate dissolved in two hundred (200) gallons of water which has been heated to approximately 110° F. is run into the kettle, and the entire mixture agitated for a period of time sufficient to allow the aluminum salt to react with the water solution of the sodium hydrogenated ricinoleate, this usually taking, for the quantities above set forth, thirty (30) minutes. The heating of the mixture is then stopped and the mixture is agitated until the aluminum soap has completely separated from the liquid. Thereafter, the liquid solution is drained from the bottom of the kettle. The soap remaining in the kettle is then washed by pumping therein water of the amount of about two hundred (200) gallons, the water being maintained at a temperature of from 150° to 175° F. After stirring for about ten (10) or fifteen (15) minutes, the agitation is stopped and the wash water is drained from the bottom of the kettle. This procedure may be repeated until the aluminum soap of the hydrogenated castor oil is sufficiently pure for commercial purposes. Usually it is sufficient if the washing is repeated three (3) times.

This white insoluble soap of hydrogenated ricinoleic acid or soap of 12-hydroxy-stearic acid also contains at least 3 to 6% of the free fatty acid of hydrogenated castor oil or, stated differently, said soap contains in admixture therewith at least 3 to 6% of 12-hydroxy-stearic acid and in many cases a considerably greater percentage is present. Therefore, greases or lubricants having incorporated therein soaps of 12-hydroxy-stearic acid also carry varying amounts of 12-hydroxy-stearic acid, and since greases may be produced in accordance with the present disclosure carrying up to 50% of soaps of 12-hydroxy-stearic acid, said greases inherently carry not only small amounts of 12-hydroxy-stearic acid, but in some cases relatively large amounts of 12-hydroxy-stearic acid. Therefore, in the above example the aluminum soap of 12-hydroxy-stearic acid carries at least 3 to 6% of 12-hydroxy-stearic acid. If one-half percent of the soap produced as above set forth is added to the grease as set forth in Table II, then the amount of 12-hydroxy-stearic acid which will be present will vary between .015 to .03%. If in the composition set forth in Table II the amount of aluminum soap of hydrogenated castor oil is increased to 10% as it may well be, then the amount of 12-hydroxy-stearic acid present in the grease will vary from 0.3 to 0.6%. If 50% of the aluminum soap of 12-hydroxy-stearic acid is present in the composition set forth in Table II, then the amount of free 12-hydroxy-stearic acid will vary between 1.5 to 3%.

The aluminum salt of hydrogenated castor oil produced as above, contains a considerable quantity of water and, therefore, is pumped through a centrifuge where most of the water is removed. From the centrifuge, the moist aluminum salt of hydrogenated ricinoleic acid is removed to a hammer mill which breaks the salt into small granules. Preferably, the granules are then placed on trays and introduced into ovens heated with hot air to a temperature of about 200° F. The aluminum salt of the hydrogenated castor oil is allowed to remain in the oven until it is dried, which is usually about twenty-four (24) hours. The dried salt is then run through a hammer mill adapted to break the salt into such a fine flocculent state that substantially all of the salt will pass through a one hundred (100) mesh sieve.

Instead of using aluminum sulphate, aluminum chloride may be used or any other water soluble aluminum salt, the acid radical of which will combine with the sodium to release the aluminum so that it may combine with the fatty acid, the sodium salt being water soluble.

Instead of treating hydrogenated castor oil as set forth, for a portion of the hydrogenated castor oil there may be substituted stearic acid or any material having present this constituent. The mixture of the hydrogenated castor oil and the stearic acid containing material may be treated as hereinbefore described in connection with hydrogenated castor oil. However, with the presence of the stearic acid component on the addition of a water soluble aluminum salt, aluminum stearate is formed in addition to the aluminum soap of hydrogenated ricinoleic acid or castor oil. In general, the hydrogenated ricinoleic acid may have substituted therefor up to fifty percent (50%) of a stearic acid component. For example, instead of treating one thousands pounds (1000 lbs.) of hydrogenated castor oil, there may be substituted for this constituent a mixture of nine hundred pounds (900 lbs.) of hydrogenated castor oil and one hundred pounds (100 lbs.) of a material containing stearic acid; or the mixture may contain twenty percent (20%), thirty percent (30%), forty percent (40%), or fifty percent (50%) of a stearic acid component or any other intermediate percent, as for example twenty-five percent (25%), thirty-five percent (35%), or forty-five percent (45%). The amount of stearic acid material which is substituted for a portion of the hydrogenated castor oil will vary in accordance with the desired characteristics of the final lubricating grease and the use for which it is intended.

It is desired to point out that the presence of the stearic acid component in the mixture of hydrogenated castor oil and stearic acid facilitates the cooking operation, that is, the melting of the fatty material, and further, produces a product which can be washed and centrifuged with greater ease than the aluminum soap of hydrogenated castor oil itself. This is a decided advantage.

The aluminum salt of the hydrogenated ricinoleic acid containing because of its method of production a small quantity of 12-hydroxy-stearic acid or hydrogenated castor oil, together with a metal salt of a saturated or unsaturated fatty acid and particularly aluminum stearate or other aluminum or fatty acid soap, may be introduced into a lubricant base in any proportion, and particularly in such proportions as are herein pointed out which function to prevent oil seepage of bleeding and also function to improve the texture of the resulting lubricant, that is, which will prevent the granulation of the lubricant, reduce the graininess of the lubricant, and in general make the resulting lubricating grease smoother and firmer than would have been the case had the material containing the 12-hydroxy stearic acid radical been omitted.

While it is not desired to be limited to a lubricating base or a grease containing any particular percentage of a material containing a soap of 12-hydroxy-stearic acid [or 12-hydroxy-stearic acid itself, or hydrogenated castor oil] in general it may be stated that the lubricant base may have said materials including the soaps present in amounts up to 50% of the total weight of the grease. In the more limited aspect of the present invention, the aluminum salt of hydrogenated ricinoleic acid, and particularly [castor oil] hydrogenated castor oil, and 12-hydroxy-stearic acid may be present in the lubricant or grease in amounts varying between ¼ to 10%, based on the total weight of the lubricating grease, the latter preferably having present other soaps such as ordinary aluminum soaps, sodium soaps, or the like. Satisfactory results have been obtained when the aluminum salt of hydrogenated ricinoleic acid or aluminum salt of 12-hydroxy-stearic acid is present in amounts ranging from ½ to 5% based on the total weight of the lubricating grease. [Similar percentages of 12-hydroxy-stearic acid or hydrogenated castor oil may also be used, preferably in combination with the metal soaps of the saturated fatty acids such as aluminum stearate.] It may be pointed out that the solid or semi-solid lubricants of the present invention having incorporated therein aluminum soaps of hydrogenated ricinoleic acid, and especially hydrogenated castor oil and/or the equivalents thereof, as above pointed out, together with other soaps such as aluminum stearate or sodium soaps, have more desirable properties than would have been the case had the same lubricant been used without the addition of the herein set forth aluminum soap of hydrogenated ricinoleic acid, and preferably the aluminum soap of hydrogenated castor oil or their equivalents, as above pointed out.

As pointed out, instead of using the aluminum soap of hydrogenated castor oil, a mixture of the soap and aluminum stearate or other metal fatty acids, especially the metal soaps of the higher saturated and unsaturated fatty acids containing twelve (12) carbon atoms or more, the latter functioning as a carrier dispersing or blending agent, may be incorporated in a grease or semi-solid lubricant. When the mixture is incorporated in the lubricant or grease usually more of the mixture is used than when the aluminum soap of hydrogenated castor oil is introduced by itself into the grease. For example, when one-quarter (¼) of one (1) percent of the aluminum soap of the hydrogenated castor oil is added to the lubricating grease to produce the desired result, if a fifty-fifty mixture of the said soap and an aluminum stearate is used one-half (½%) percent of the mixture will be added to the lubricant to produce the same or similar result.

The advantages residing in the present invention will be clear from the following: a regular aluminum stearate grease was made up according to the following formula:

TABLE I

| | Percent |
|---|---|
| Aluminum stearate | 7 |
| 175 vis. oil at 100° F. (mixed base paraffin and asphalt oil) | 93 |

The grease was made by dissolving commercial aluminum stearate in the oil and heating to about 290–300° F. The resulting grease was smooth and clear, but on standing for several days, a small amount of oil separated from the grease. The A. S. T. M. worked penetration on the above grease was 357.

Instead of using 7% of aluminum stearate, a similar lubricating grease was made up, but there was incorporated therein one-half percent (½%) of aluminum soap of hydrogenated castor oil. The mixture then comprised:

TABLE II

| | Percent |
|---|---|
| Aluminum stearate | 6½ |
| Aluminum soap of hydrogenated castor oil | ½ |
| 175 vis. oil at 100° F. (mixed base paraffin and asphalt oil) | 93 |

The lubricant produced in accordance with the mixture of Table II stood for several days without any oil seeping therefrom. This indicates the advantage of having present the aluminum soap of hydrogenated castor oil. The A. S. T. M. worked penetration on the above grease was 346.

It is further desired to point out that when the lubricant set forth in Table I had a small amount of lump rosin added thereto, as for example .06%, the lubricant was very grainy and leaked oil rather badly. The addition of the small amount of rosin to the lubricant of Table II produced no such result. The lubricant of Table II with the addition of rosin was smooth and firm and had an A. S. T. M. worked penetration of 333.

The above example indicated that by the addition of a small amount of the aluminum soap or hydrogenated ricinoleic acid, and particularly other soaps, and especially those containing aluminum soaps, that the resulting grease is more stable, and smoother, and firmer, than a grease of similar characteristics, but in which no aluminum soap of hydrogenated castor oil is present.

Further, as pointed out, when agents are added in small quantities to make the grease harder, as for example, rosin, rosin oil, the resulting grease, despite the addition of the hardening agent, is still smooth and firm and does not leak oil, provided there has been incorporated in the grease a small amount of an aluminum soap of hydrogenated ricinoleic acid, or of hydrogenated ricinoleic acid, or 12-hydroxy-stearic acid, the soap or equivalent being present in amounts varying from one-quarter (¼) to ten percent (10%) and preferably one-quarter (¼%) to five percent (5%). The aluminum soap of hydrogenated ricinoleic acid or equivalent may be present in some cases in greater amounts up to fifty percent (50%) of the total weight of the grease.

It is also desired to point out that those greases having the granulation inhibitor of the present invention, after being mixed, are poured into pans of any suitable size, as for example, twenty-four by sixty inches (24 x 60), the depth of the grease layer being about three inches (3″), and then cooled by blowing first with warm air having a temperature of 125° F. and then slowly reducing the temperature of the air to room temperature over a period of eight (8) to twelve (12) hours.

It may be pointed out that it is a general rule that the hardness of the grease may be increased by increasing the amount of soap present. In other words, if the grease of Table II has the aluminum stearate increased from six and one-half percent (6½%) to eight (8%), the resulting grease would have a harder consistency than a grease having merely six and one-half percent of the aluminum stearate.

The aluminum soap of hydrogenated ricinoleic acid and especially castor oil may be incorporated in a soda soap grease in accordance with the following:

| | Percent |
|---|---|
| Sodium soap of hydrogenated fish fatty acids having a titre of 51 to 56° | 2.5 |
| Sodium soap of hydrogenated fish fatty glycerides | 1.0 |
| Sodium soap of regular castor oil | .25 |
| Sodium soap of hydrogenated castor oil | .25 |
| Sodium soap of rosin | .2 |
| Aluminum soap of hydrogenated castor oil | .3 |
| Aluminum stearate | .2 |
| 100 coastal oil | 15.0 |
| 3600 Green cast red coastal oil | 79.65 |

It is desired to point out that in the above composition the soap content may be varied to suit the type of lubrication required. In said composition the amount of the sodium soaps may be materially increased and moreover, the amount of aluminum soap of hydrogenated castor oil may be increased. It may vary, as pointed out, from one-quarter (¼%) percent to ten (10%) percent or even, in some circumstances, less than one-quarter (¼%) of one percent (1%), this however being unusual. Instead of using in the above composition aluminum stearate as the carrier dispersing or blending agent other aluminum soaps of the higher fatty acids may be used as herein previously disclosed. However, the aluminum stearate gives the preferred results. The amount of blending agent used may vary over a very considerable range depending upon the character of the lubricating grease being treated.

In preparing the above, the sodium soaps and the Coastal Pale are heated in a vessel to which is then added .3 of 1% of the aluminum soap of hydrogenated castor oil and .2 of 1% of aluminum stearate. The heating is then continued until the grease melts to a sticky mass. Thereupon, additional oil, that is, the 3600 green cast red oil is added slowly while stirring, the mixture being brought to a temperature of about 350° to 410° F. The grease is then pumped or poured at a temperature of about 350° to 360° F. into pans of any suitable size, the depth of the grease layer being about three (3) to four (4) inches. The grease is then cooled in a manner similar to that pointed out in connection with previous examples. The grease prepared in accordance with the above had an ASTM worked penetration of about 310 to 325 and the grease had a melting point of 300° F. The grease did not leak oil and was exceedingly stable during storage. In the grease prepared without the aluminum salt of hydrogenated castor oil, there would have been some leakage, and during storage, the grease would not have been as stable. This inidcates the advantages of the present invention.

Further, it is desired to point out that if the aluminum soap of hydrogenated castor oil was omitted, the grease did not gel properly and the oil separated from the soap base.

Instead of incorporating the aluminum stearate in the grease in the manner above set forth, the grease may be prepared with the aluminum soap of hydrogenated castor oil, and another grease may be prepared with the aluminum stearate. When the two greases have been poured and cooled they may be then milled together as set forth in Fraser Patent No. 2,257,945.

It is desired to point out that the grease is poured at about 350° to 360° F., and the grease is cooled from this temperature to approximately 100° F. in twelve (12) hours to thereby produce a transparent grease, the water content of which is less than .25% (1¼ of 1%).

The [aluminum soaps of hydroxy-stearic acid, and particularly the] aluminum soap of 12-hydroxy-stearic acid, this soap being produced by various means, but preferably by saponification of hydrogenated ricinoleic acid, is not readily soluble in the lubricant base when used by itself, but is maintained substantially permanently dispersed when used with other blending or dispersing agents, such as aluminum soaps of the higher saturated fatty acids, or the sodium soaps of the fatty acids, and more particularly the higher saturated fatty acids. At temperatures between 180° F. and 250° F. and higher, the dispersion of the aluminum soap of hydrogenated ricinoleic acid is substantially permanent.

If the aluminum soaps of non-hydrogenated commercial castor oil are used to replace the aluminum soap of the hydrogenated castor oil in the above compounds, the resulting grease is much softer and the oil seeps out. It may be stated that in general, greases made with the addition of the aluminum soap of hydrogenated ricinoleic acid, and especially hydrogenated castor oil, said greases containing other soaps of the fatty acids, soaps of rosin, and the like, are similar in body, exceedingly stable relative to oil separation, and retain their consistency better when worked than greases of substantially the same composition, but in which there is no aluminum soap of the hydrogenated ricinoleic acid, or more specifically the aluminum soap of hydrogenated castor oil.

It may be pointed out that the hydrogenated ricinoleic acid of the 12-hydroxy-stearic acid has an OH group present in the chain, and this is not true of the other fatty acids. It is believed that the manner in which the aluminum salt of hydrogenated ricinoleic acid acts in the present invention to prevent granulation and seepage of oil is due to the presence of an OH group in the chain.

[This same hydroxy fatty acid group is present in 12-hydroxy-stearic acid and in hydrogenated castor oil, and these materials when incorporated in a lubricant would impart the same characteristic chemical and physical properties to said lubricant as when the soaps of 12-hydroxy-stearic acid are incorporated in the lubricant. As pointed out, the essential structural feature of all of these compounds is the presence of the hydroxy-fatty acid radical of hydrogenated ricinoleic acid, and therefore the compounds are full equivalents and the soaps when produced in accordance with the method herein set forth contain in some cases small amounts and in other cases relative large amounts of 12-hydroxy-stearic acid itself.] From the above, it can be gathered that the aluminum soaps of the other fatty acids are not the equivalent of the aluminum soaps of hydrogenated ricinoleic acid as derived from hydrogenated castor oil.

While it is clear that the amount of carrier or blender may greatly vary, in general there should be about one-quarter (¼) or one-half (½) to fifteen (15) parts of blending agent for every part of aluminum salt of hydrogenated castor oil [or for every part of 12-hydroxy-stearic acid or hydrogenated castor oil]. In some cases the amount of blending agent may be in the ratio of three (3) to thirty (30) parts of the blending agent to one (1) part of the material containing the hydroxy fatty acid radical of hydrogenated ricinoleic acid as typified by the aluminum soap of hydrogenated castor oil, or said soap containing a small amount of 12-hydroxy-stearic acid [, or 12-hydroxy-stearic acid itself, or hydrogenated castor oil].

[In accordance with the present invention, lead soaps of hydrogenated ricinoleic acid may also be incorporated in grease made from a mineral, animal or vegetable base, or a combination of the same. The incorporation of the lead soaps of hydrogenated ricinoleic acid produces a grease which has a good body, even in the presence of only a small percentage of the lead soap. The grease containing the lead soap of ricinoleic acid is characterized by hardness, a high melting point even in the presence of a small percentage of soap, insolubility in water, and a high film strength, as compared to other greases, including those greases containing the ordinary lead soap of castor oil. The lead soap of hydrogenated ricinoleic acid is soluble in the usual lubricant bases, as for example mineral oils, in proportion up to 40 to 50%. Usually, it is only necessary to incorporate in the grease a small percentage of this soap, as for example ½ to 2%, with the result that there is produced, even with this low soap content, a grease that has a high melting point and is characterized by water insolubility.

[While it has been stated that the lubricant grease should only contain a small percentage of the lead soap of hydrogenated ricinoleic acid, that is from about ¼ to 4%, greases containing up to 50% of this soap which are hard greases may be used as block greases on railroad axles, colander bearings, and for other purposes where it is known that a hard grease is necessary or desirable.

[The following table sets forth greases containing 1%, 2% and 4% of the lead soap of hydrogenated ricinoleic acid, together with the worked penetration and the melt-ink point of the resulting greases:

TABLE III

| | A. S. T. M. worked penetration | Ubbelohde melting point |
|---|---|---|
| | | ° F. |
| 4% lead soap of hydrogenated ricinoleic acid | 250 | 253 |
| 2% lead soap of hydrogenated ricinoleic acid | 317 | 250 |
| 1% lead soap of hydrogenated ricinoleic acid | 348 | 249 |

[Mixed soap base greases containing the lead soap of hydrogenated ricinoleic acid, together with other soaps, were prepared by taking a grease containing 2% of the lead soap of hydrogenated ricinoleic acid, as for example the lead soap of hydrogenated castor oil, and mixing therewith a soda base grease containing 4% of a soda soap. These greases were mixed when cold in various proportions. 75% of the grease containing the lead soap of hydrogenated ricinoleic acid was mixed with 25% of the soda soap grease and the grease had a Ubbelohde melting point of 255° F. The final mixed base grease carried a total soap content of 2½%, of which 1½% was the lead soap of hydrogenated castor oil and 1% was the ordinary soda soap. In place of the ordinary soda soap there may be substituted a soda soap of hydrogenated castor oil. Another grease was prepared by mixing 62½% of the grease containing 2% of the lead soap of hydrogenated ricinoleic acid with 37½% of the grease containing 4% of a soda soap. The final grease which has a Ubbelohde melting point of 300° F. and carried approximately 3% total soap content, has incorporated therein approximately 1% of a lead soap and approximately 2% of the soda soap.

Another grease was made by mixing 25% of the grease containing 2% of the lead soap of hydrogenated castor oil and 75% of the grease containing 4% of the soda soap. The resulting grease which carried 3½% total soap content and had a Ubbelohde melting point of 205° F. carried ½% of the lead soap and 3% of the soda soap.

[The above greases were smooth, transparent and of good appearance. If the above mixture of greases are heated above the melting point and cooled, the heat treated greases are much softer and grainier than if the greases are mixed cold, and in view of the above, it is desired that the greases be mixed in a cold state, although heat may be employed under some circumstances.

[Another mixed base soap grease was made by mixing 50% of the grease containing 2% of the lead soap of hydrogenated castor oil with 50% of aluminum stearate grease containing 5% of aluminum stearate. The resulting grease which contained 1% of the lead soap and 2½% of the aluminum stearate soap had a Ubbelohde melting point of 205° F. The two greases were mixed in the cold to provide a smooth, transparent grease of good appearance.

[Another mixed soap base grease was prepared by mixing in the cold 50% of a grease containing 2% of the lead soap of hydrogenated castor oil with 50% of a lime base grease containing 10% of a lime soap. The resulting grease containing 1% of the lead soap of hydrogenated castor oil and 5% of a lime soap of fatty acids, had a melting point of 205° F. The mixed grease was smooth, translucent and of good appearance. Another grease was made by mixing together equal parts of a grease containing ½% of a lead soap of hydrogenated castor oil and a soda base grease containing 10½% of soda soap. The resulting grease was melted together and poured into a pan at 250° F. It was then cooled and found to have a melting point of 356° F. and an A. S. T. M. worked penetration of 240. The grease contained a total soap content of 11%, of which ½% was a lead soap, and the remainder was the soda soap. The free alkali content of the resulting grease, as determined by the regular A. S. T. M. method was .08%, and the grease had a Saybolt oil viscosity of 500 seconds at 100° F. When rolled in ball bearings, it retained the same approximate consistency for a working time of two hours.]

Greases may be prepared containing the alkali earth soaps of hydrogenated ricinoleic acid such as castor oil. More specifically, there may be dissolved and incorporated in the mineral oil 1 to 8% of calcium soap of hydrogenated castor oil; or 1 to 8% of the strontium soap of hydrogenated castor oil; or 1 to 8% of the barium soap of hydrogenated castor oil. These soaps are dssolved and incorporated in the mineral oil at a temperature of 350°, and on cooling the soap separated from the oil. However, if the grease is reheated at a suitable temperature, as for example 220°, and there is added an agent adapted to cause an emulsion to form, as for example about 1% of water based on the weight of the grease, an emulsion is formed and solid greases are obtained on cooling.

[There may also be dissolved, dispersed and/or incorporated in a grease having a mineral, vegetable oil, or animal base, 1 to 5% of one or more of the metal soaps of hydrogenated ricinoleic acid of the following metals: magnesium, tin, nickel, cobalt, chromium, and manganese. All of these soaps go into solution in the mineral oil at temperatures below 300° F. The greases were permitted to cool by placing them in an electric oven maintained at 260° F., cutting off the current and permitting the greases to slowly cool at room temperature in 8 to 10 hours. The grease containing the nickel soap of hydrogenated ricinoleic acid, as for example castor oil, yielded a soft gel, but the other greases were of a more fluid viscous consistency. These greases of a fluid consistency exhibited properties which make them adaptable for many lubricating purposes.

[While the present invention in its preferred form is directed to the production of greases in a solid form and desirably having a low soap content with a high melting point, the invention is not limited thereto and includes the production of liquid lubricating mediums, including fluid viscous lubricants adaptable for use in connection with the lubrication of Diesel engines. Such fluid lubricants may also be used as transmission oils, motor oils, and the like.

[While it has been specified that the soap of hydrogenated castor oil which is used is the metal soap, it is within the province of the present invention, in some cases, to substitute for the metal base an organic radical to produce an organic soap. For example, instead of using a metal constituent, the hydrogenated fatty acid may be combined with ethanolamine to produce an amine soap which when incorporated in the lubricating greases, especially the fluid viscous lubricants gives desirable results.

[The soda soap of hydrogenated ricinoleic acid, as for example castor oil, may be formed directly in a mineral oil such as was used for the production of the soaps immediately above described, said oil having a 300 viscosity at 100° Saybolt. The sodium soap of hydrogenated castor oil may be made by the direct saponification of hydrogenated castor oil present in the mineral oil. After the saponifying caustic soda has been added, the temperature is raised to 350° F., and the mixture heated during saponification to drive off substantially all of the moisture. The resulting grease is smooth, pliable and has a worked A. S. T. M. consistency of 350 to 375 and contains 8% of sodium soap.]

While in the majority of cases the herein described soaps may be dispersed in a mineral oil base, it is obvious that the mineral oil base may have mixed therewith any of the well known lubricating bases including hydrogenated fish oil, animal oils, vegetable oils, and rosin or a plurality thereof.

As previously pointed out, the soap which is incorporated in the grease in accordance with the present invention may in one form of the invention be a soap of hydrogenated ricinoleic acid which, as stated, may be termed a 12-hydroxy-stearic acid. This designation, in accordance with the common usage, means that the hydroxy group is on the twelfth carbon atom from the carboxyl group.

[In accordance with the present invention, the lubricating medium as, for example, a grease, may have incorporated therein a soap of a 10-hydroxy-stearic acid, as for example the lead soap of this acid. This product may be manufactured by several accepted methods of preparation, including a metathesis reaction utilizing a soluble lead salt such as lead acetate in reaction with the sodium soap of the 10-hydroxy-stearic acid. The lead soap of the 10-hydroxy-stearic acid has a somewhat softer texture and a lower solubility in the mineral oil bases in which the lead soap of the 12-hydroxy-stearic acid was incorporated. Further, the lead soap of the 10-hydroxy-stearic acid does not gel and/or harden the grease in which is incorporated to the same optimum degree as that which occurs when the lead soap of the 12-hydroxy-stearic acid, the acid of which has been produced by acid or by other means, is incorporated in the grease.

[In accordance with the present invention there may also be incorporated in a lubricating medium soaps of the poly-hydroxy-stearic acids. For example, the soaps may be formed from hydroxy-stearic acids in which the hydroxy groups are in the 9 and 10 carbon position. The polyhydroxy stearic acid may be prepared by oxidation and subsequent hydroxylization of oleic acid. The soaps of this acid may be prepared by metathesis, as above set forth, and by direct combination of the above fatty acid with oxides of metals as, for example, heating the fatty acid dispersed in a hydrocarbon oil to which there has been added a metal constituent, as for example lead oxide or litharge. While the methathesis method and the above method produce slightly different end products, the general behavior is substantially the same.

[In accordance with the present invention, the lubricating medium may have incorporated therein lead, aluminum, or sodium soaps of polyhydroxy stearic acid, said soap being produced by the metathesis or double decomposition method. The sodium soap produced, as above set forth, was only slightly soluble in the mineral oil base and was soluble even with difficulty at 400° F. Therefore, it is necessary when incorporating this product to provide for a carrier much in the same manner as when the aluminum soap of ricinoleic acid is incorporated in a lubricant base.

[The aluminum soap of the 9 and 10 dihydroxy-stearic acid also was slightly soluble in the hydrocarbon oil, preferably at temperatures approximating 400° F.

[The lead soap of this dihydroxy-stearic acid, the hydroxy groups being in the 9 and 10 position, was prepared by the methods above set forth, and its properties were substantially parallel to that of the sodium and aluminum soap above set forth, execept that it was more soluble in the hydrocarbon base and the solubility was better at 300° F. On heating to a higher temperature there was some degradation of the lead soap which resulted in a grease which on cooling possessed the characteristics of a grease showing a low solubilized content of lead soap.]

[From the above it appears that] The presence of more than one hydroxy group in a hydroxy-stearic acid soap reduces the solubility of metal soaps thereof in the lubricant base. Because of this reduced solubility, these soaps should preferably be added to the lubricant base in amounts under 1%, although when a carrier is used the amounts may be increased. However, it is desired to point out that the soaps of the polyhydroxy-stearic acids, as a class, exhibit inferior jellying characteristics as far as their effects upon the mineral oil base is concerned.

[It is desired to point out that irrespective of whether the lubricating medium is a grease or a viscous non-solid lubricating medium, it may have incorporated therein a mixture of a metal soap of a mono or polyhydroxy-stearic acid, together with an organic soap of a mono or polyhydroxy-stearic acid. In other words, instead of having a metal coupled to the acid constituent, the hydroxy-stearic acid may have coupled thereto an organic base. In the more specific aspect of the invention] The metal soap of the 12-hydroxy-stearic acid which is herein termed the metal soap of hydrogenated ricinoleic acid, may have mixed therewith an organic soap of the 12-hydroxy-stearic acid.

[In general it may be stated that in the lubricating medium herein disclosed, all or part of the metal soap of any of the hydroxy-stearic acids herein set forth may have all or part of the metal soap substituted by a soap made by saponifying a hydroxy-stearic acid with an organic base to produce what may be termed an organic soap.]

Referring to the preparation of greases which contain the aluminum soaps of hydrogenated ricinoleic acid, together with a carrier for the same, it is desired to point out that the aluminum soaps of stearic acid and the aluminum soaps of the hydrogenated ricinoleic acids may be cooked together to thereby provide a much better dispersable produce. In other words, the solubility of the aluminum soap of the hydrogenated ricinoleic acid is greatly improved due to the fact that one or more of the bonds of the aluminum contains or is coupled up with stearic acid, while the other bond is coupled up or contains hydrogenated ricinoleic acid.

It is desired to point out that in general the lubricants, including the greases, may have present [an organic soap of any of the hydroxy-stearic acids, including the monohydroxy-stearic acid and the polyhydroxy-stearic acids, and more specifically] any of the herein mentioned metallic metal soaps, including aluminum [sodium] barium, [lead] strontium, calcium, magnesium, [tin, nickel, cobalt, chromium, manganese,] and the like, or the lubricant including greases may have incorporated therein a plurality of any of the herein described soaps to thereby produce a mixed base lubricant.

The following illustrates the production of greases using an aluminum stearate grease which did not have incorporated therein a soap of 12-hydroxy-stearic acid [or other equivalents, hydrogenated castor oil, or 12-hydroxy-stearic acid itself, and greases in which in one case there is incorporated hydrogenated castor oil, and in another case 12-hydroxy-stearic acid. In one case] a mixture was made of 6.8% aluminum stearate and 93.2% of a mixed paraffin and asphalt base oil having 180 Saybolt viscosity at 100° F. The resulting grease had an ASTM worked penetration of 298 and was characterized by graininess and substantial seepage of oil.

[Another lubricant was compounded having 6.8% aluminum stearate, 92.7% of the same oil base, and .5% of hydrogenated castor oil. The resulting grease had a worked penetration of 331. The grease instead of being grainy was smooth and showed substantially no oil separation. Another grease was compounded, using 6.8% of aluminum stearate, 92.7% of the same oil base, and .5% of free fatty acid of hydrogenated castor oil, or 12-hydroxy-stearic acid. The resulting grease was transparent and had an ASTM worked penetration of 334. The resulting grease was smooth and showed no oil separation.]

Instead of using an aluminum stearate in the above examples, other aluminum salts of saturated and unsaturated fatty acids may be used.

This application is a continuation-in-part of application Serial No. 347,533, filed July 25, 1940, said application being a continuation-in-part of application Serial No. 268,781, filed April 19, 1939, *both now abandoned.*

I claim:

1. A lubricating grease containing a lubricant base together with a *calcium* soap of [a] 12-hydroxy-stearic acid [together with a blending agent therefor].

[2. A lubricating grease containing a lubricant base together with a metal soap of a 12-hydroxy-stearic acid together with a blending agent therefor.]

[3. A lubricating grease containing a lubricant base together with a soap of 12-hydroxy-stearic acid.]

4. A lubricating grease containing a lubricant base together with [a] *an alkaline earth* metal soap of 12-hydroxy-stearic acid.

5. A lubricating grease containing a lubricant base together with a *calcium* soap of hydrogenated ricinoleic acid.

[6. A lubricating grease containing a lubricant base together with 1 to 10% of a soap of hydrogenated ricinoleic acid.]

7. A lubricating grease containing a lubricant base together with *an alkaline earth* [a] metal soap of hydrogenated ricinoleic acid.

8. A lubricating grease containing a lubricant base together with 1 to 10% of *an alkaline earth* [a] metal soap of hydrogenated ricinoleic acid.

[9. A lubricating grease containing a lubricant base and having dispersed therethrough a metal soap of hydrogenated ricinoleic acid together with a blending agent therefor.]

[10. A lubricating grease containing a lubricant base, said grease having its normal texture modified by the presence of a metal soap of hydrogenated ricinoleic acid acting as a granulation inhibitor.]

11. A lubricating grease containing a lubricant base together with an aluminum soap of hydrogenated ricinoleic acid in an amount adapted to inhibit granulation of the grease.

12. A lubricating grease containing a lubricant base together with an aluminum soap of 12-hydroxy-stearic acid in an amount adapted to inhibit granulation of the grease, and a carrier for said granulation inhibitor.

13. A lubricating grease containing a lubricant base together with an aluminum soap of hydrogenated ricinoleic acid in an amount adapted to inhibit granulation of the grease, and a metal soap of a fatty acid having at least twelve carbon atoms, said metal soap functioning as a carrier and blending medium for said granulation inhibitor.

14. A lubricating grease containing a lubricant base together with an aluminum soap of hydrogenated ricinoleic acid in an amount adapted to inhibit granulation of the grease, and an aluminum soap of a fatty acid having at least twelve carbon atoms, said aluminum soap functioning as a carrier and blending medium for said granulation inhibitor.

15. A lubricating grease containing a lubricant base together with from ¼% to 10% of an aluminum soap of hydrogenated ricinoleic acid, and a metal soap of a fatty acid having at least twelve carbon atoms functioning as a carrier and blending agent for said aluminum soap.

16. A lubricating grease containing a lubricant base together with from ¼% to 10% of an aluminum soap of hydrogenated ricinoleic acid, and an aluminum soap of a fatty acid having at least twelve carbon atoms, the latter functioning as a carrier and blending agent for said aluminum soap of hydrogenated ricinoleic acid.

17. A lubricating grease containing a lubricant base together with ¼% to 5% of an aluminum soap of hydrogenated ricinoleic acid and a carrier adapted to permanently disperse and incorporate the aluminum soap in the lubricating grease, the carrier being present in the ratio of three to thirty parts to one part of said aluminum soap.

18. An aluminum base grease having incorporated therein ½% to 5% of the aluminum soap of hydrogenated ricinoleic acid.

19. An aluminum base grease having incorporated therein aluminum stearate and from ½% to 5% of the aluminum soap of hydrogenated ricinoleic acid.

20. A soda base grease having incorporated therein ½% to 5% of an aluminum soap of 12-hydroxy-stearic acid.

21. A soda base grease having incorporated therein sodium soaps of fatty acids, sodium rosinate, and a small percentage of an aluminum soap of 12-hydroxy-stearic acid, the latter functioning to stabilize the grease and prevent oil leakage.

22. A soda base grease having incorporated therein fatty acid soaps, sodium soaps, a hardening agent, a small percentage of an aluminum soap of hydrogenated ricinoleic acid, the latter functioning to stabilize the grease and prevent oil leakage, and a carrier and blending agent for said aluminum soap.

23. A soda base grease having incorporated therein about four percent (4%) of fatty acid sodium soap, less than one percent (1%) of a hardening agent, less than one percent (1%) of an aluminum soap of hydrogenated ricinoleic acid, the latter functioning to stabilize the grease and prevent oil leakage, and less than one percent (1%) of a carrier and blending agent for said aluminum soap.

24. A soda base grease having incorporated therein up to four percent (4%) of fatty acid sodium soap, a hardening agent, one-quarter (¼%) to five percent (5%) of an aluminum soap of hydrogenated ricinoleic acid, the latter functioning to stabilize the grease and prevent oil leakage, and a carrier and blending agent for said aluminum soap, the former being present in the ratio of ¼ to 15 parts to one part of the aluminum soap.

25. A lubricating grease containing a lubricant base and an in situ-formed mixture of an aluminum soap of hydrogenated ricinoleic acid and a blending agent for said aluminum soap.

26. The method comprising inhibiting granulation of a lubricating grease by adding thereto a small proportion of an aluminum soap of hydrogenated ricinoleic acid.

27. The method comprising inhibiting granulation of a lubricating grease by adding thereto a small proportion of an aluminum soap of hydrogenated ricinoleic acid together with a carrier for said soap capable of permanently dispersing said soap in the lubricant base.

28. The method of forming a lubricating grease comprising mixing an alkaline earth metal base soap of 12-hydroxy-stearic acid with an oil base, heating the resulting mixture in the presence of water adapted to produce an emulsion, and cooling whereby a solid grease containing said soap is produced.

29. In the production of greases containing an oil base and soaps, the step of cooking together the oil base, an aluminum soap of a fatty acid and an aluminum soap of 12-hydroxy-stearic acid whereby the dispersibility of the resulting soap in the grease is greatly improved.

30. In the production of greases containing an oil base and soaps, the step of cooking together the oil base, an aluminum soap of a stearic acid and an aluminum soap of 12-hydroxy-stearic acid whereby the dispersibility of the resulting soap in the grease is greatly improved.

References Cited in the file of this patent or the original patent

UNITED STATES PATENTS

| | | |
|---|---|---|
| 2,283,602 | Fiero | May 19, 1942 |

FOREIGN PATENTS

| | | |
|---|---|---|
| 157,953 | Switzerland | Jan. 2, 1933 |